United States Patent
Moren (10) Patent No.: US 9,677,478 B2
(45) Date of Patent: Jun. 13, 2017

(54) METHOD AND ARRANGEMENT FOR CYLINDER DEACTIVATION

(71) Applicant: VOLVO CAR CORPORATION, Gothenburg (SE)

(72) Inventor: Mats Moren, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 73 days.

(21) Appl. No.: 14/746,522

(22) Filed: Jun. 22, 2015

(65) Prior Publication Data
US 2015/0377152 A1 Dec. 31, 2015

(30) Foreign Application Priority Data

Jun. 27, 2014 (EP) ..................... 14174797

(51) Int. Cl.
*F01L 1/34* (2006.01)
*F02D 13/06* (2006.01)
(Continued)

(52) U.S. Cl.
CPC .......... *F02D 13/06* (2013.01); *F01L 13/0042* (2013.01); *F02D 13/0207* (2013.01);
(Continued)

(58) Field of Classification Search
CPC .. F02D 13/0207; F02D 13/0257; F02D 13/06; F01L 13/0042; Y02T 10/18
(Continued)

(56) References Cited

U.S. PATENT DOCUMENTS

| | | |
|---|---|---|
| 2006/0224282 A1 | 10/2006 | Seo et al. |
| 2007/0233332 A1 | 10/2007 | Kawada et al. |
| 2007/0240653 A1 | 10/2007 | Petridis |

FOREIGN PATENT DOCUMENTS

| | | |
|---|---|---|
| EP | 1233160 A2 | 8/2002 |
| WO | 2013189698 A1 | 12/2013 |

OTHER PUBLICATIONS

Lucatello et al., Internal Combustuin Engine with Cylinders That Can be De-activated, with Exhaust Gas Recirculation by Variable Control of the Intake Valves, and Method for controlling an Internal Combustion Engine, US Patent Application Pub. US 2011/0313643 A1, Dec. 22, 2011.*

(Continued)

*Primary Examiner* — Ching Chang
(74) *Attorney, Agent, or Firm* — Brooks Kushman P.C.

(57) ABSTRACT

A cylinder deactivation arrangement and method of cylinder deactivation are disclosed for an internal combustion engine having a number of cylinders with at least one intake valve and at least one exhaust valve per cylinder. Each intake valve includes two different lifting levels, wherein the cylinder deactivation arrangement has an even number of cylinders. A first set of cylinders constituted by half of the even number of cylinders have intake valves configured for fully opened and partly opened lifting levels, and a second set of cylinders constituted by the other half of the even number of cylinders have intake valves configured for fully opened and closed lifting levels. The first set of cylinders have exhaust valves configured for fully opened lifting levels and the second set of cylinders have exhaust valves configured for fully opened and closed lifting levels.

10 Claims, 8 Drawing Sheets

|  | Cyl 1 | Cyl 2 | Cyl 3 | Cyl 4 |
|---|---|---|---|---|
| Intake valve | HIGH | HIGH | HIGH | HIGH |
|  | LOW | OFF | OFF | LOW |
| Exhaust valve | HIGH | HIGH | HIGH | HIGH |
|  | HIGH | OFF | OFF | HIGH |

(51) Int. Cl.
 *F02D 41/00* (2006.01)
 *F02D 13/02* (2006.01)
 *F02D 17/02* (2006.01)
 *F01L 13/00* (2006.01)
(52) U.S. Cl.
 CPC ....... *F02D 17/023* (2013.01); *F02D 41/0087* (2013.01); *F02D 13/0257* (2013.01); *F02D 41/0082* (2013.01); *F02D 2041/001* (2013.01); *F02D 2041/0012* (2013.01); *Y02T 10/18* (2013.01)
(58) Field of Classification Search
 USPC .............................. 123/90.15, 90.16, 90.18
 See application file for complete search history.

(56) References Cited

OTHER PUBLICATIONS

Extended European Search Report Dated Oct. 2, 2014, Application No. 141747972-1606, Applicant Volvo Car Corporation, 5 pages.

\* cited by examiner

Fig. 1

Prior Art

|  | Cyl 1 | Cyl 2 | Cyl 3 | Cyl 4 |
|---|---|---|---|---|
| State 1 | ON | ON | ON | ON |
| State 1 | ON | ON | ON | ON |
| State 2 | ON | OFF | OFF | ON |
| State 2 | ON | OFF | OFF | ON |

Fig. 2

| | Cyl 1 | Cyl 2 | Cyl 3 | Cyl 4 |
|---|---|---|---|---|
| Intake valve | HIGH | HIGH | HIGH | HIGH |
| Exhaust valve | HIGH | HIGH | HIGH | HIGH |
| Intake valve | HIGH | LOW | LOW | HIGH |
| Exhaust valve | HIGH | HIGH | HIGH | HIGH |
| Intake valve | OFF | HIGH | HIGH | OFF |
| Exhaust valve | OFF | HIGH | HIGH | OFF |
| Intake valve | OFF | LOW | LOW | OFF |
| Exhaust valve | OFF | HIGH | HIGH | OFF |

4 — Intake valve / Exhaust valve
3 — Intake valve / Exhaust valve
2 — Intake valve / Exhaust valve
1 — Intake valve / Exhaust valve

Fig. 3

|  | Cyl 1 | Cyl 2 | Cyl 3 | Cyl 4 |
|---|---|---|---|---|
| Intake valve | HIGH | HIGH | HIGH | HIGH |
|  | LOW | OFF | OFF | LOW |
| Exhaust valve | HIGH | HIGH | HIGH | HIGH |
|  | HIGH | OFF | OFF | HIGH |

METHOD AND ARRANGEMENT FOR CYLINDER DEACTIVATION

CROSS-REFERENCE TO RELATED APPLICATIONS

This application claims foreign priority benefits under 35 U.S.C. §119(a)-(d) to European patent application number EP 14174797.2, filed Jun. 27, 2014, which is incorporated by reference in its entirety.

TECHNICAL FIELD

The present disclosure relates generally to a cylinder deactivation arrangement in an internal combustion engine.

BACKGROUND

In prior art it is known to deactivate cylinders in order to improve fuel efficiency and reduce emissions for internal combustion engines. The existing solutions may operate, and have their highest efficacy, at low engine load levels. One of the typical solutions is to deactivate half of the number of cylinders in an engine by deactivating both the intake and exhaust valves for those cylinders. By deactivating both the intake and exhaust valves the cylinder becomes fully deactivated. Such cylinder deactivation significantly decreases the fuel consumption and thereby the CO2 emission levels at certain load levels for internal combustion engines. Although the effect is only present at a limited RPM range cylinder deactivation as presented by the prior art has a positive overall effect on for example vehicles fuel consumption.

There are mainly two problems that commonly are addressed by cylinder deactivation systems which both affect the fuel consumption for internal combustion engines. The first problem is excessive amount of cylinder volume at certain RPM levels and load levels creating pumping losses when air is dragged into or exhaust are pushed out of the cylinders. The second problem is the relative slow combustion and heat release on low load levels. Cylinder deactivation addresses both those problems and thereby decreases fuel consumption both by reducing the pumping losses and by and increasing the combustion speed by reducing the cylinder volume.

The problem with pumping losses is present especially at low cylinder pressure and mainly due to the need to draw air in to the cylinders. Furthermore, low pressure in the cylinders of an internal combustion engine is associated with relatively high fuel consumption in relation to the power output due to higher energy required for the combustion reaction. By deactivating cylinders during low load levels, fewer cylinders are required to draw air from the intake manifold which means that the pumping losses as well as the total cylinder volume are decreased. The reduced pumping losses can for example be mainly achieved by keeping both the exhaust and intake valves closed creating a vacuum within the deactivated cylinder either above or below the piston. The vacuum is created above the piston when it moves downwards past its middle point and below the piston when it moves upwards. This creates a state where the piston will always strive to travel towards its middle position, which substantially eliminates the pumping losses.

The conventional solution for cylinder deactivation uses systems with two states where cylinders might be either active or inactive. This is achieved with valves that have either one or two lifting levels each, for example cylinder one might have one lifting level while cylinder two might have two lifting levels. Lifting levels can also be referred to as modes. The lifting levels in such solutions are the same for all cylinders.

Valves with two modes present multiple benefits and is an option presented in prior art. Although two lifting levels is an option it would be beneficial to provide additional lifting levels in order to save even more fuel and decrease emissions. The idea with this is to provide the possibility of utilizing more than two cylinder deactivation states. If valves with more than two lifting levels are used multiple states can be used creating a more dynamic cylinder deactivation.

The problem that prior art solutions encounter when trying to provide more than two states is that equipping each valve with more than two lifting levels present problems with lubricants, seals, cost and space within the engine and the engine bay. For example, in a solution utilizing cam profiles, two lifting levels can be achieved by two cam profiles, which take less space than for example three cam profiles. Thereby, the problem with the current solution is that, although significant fuel savings can be achieved, the methods applicability range, i.e., the RPM range where cylinder deactivation is applicable, is limited due to the limitation to two states and two lifting levels. States are modes of cylinder deactivation that the engine can be set to, i.e., a state of cylinder valve settings that allows for different properties. In order to accomplish more than two states and thereby increase the applicability range the prior art presents solutions utilizing electrical valves. Electrical valves have been used that provides step-less opening options for each valve individually thereby enabling more than two lifting levels and multiple states. However, those solutions are expensive and require advanced engine control units to operate.

With the above problems and solutions in mind it would therefore be advantageous to provide a cylinder deactivation arrangement for an internal combustion engine that can be utilized at an extended RPM range without increasing the complexity of each valve arrangement.

SUMMARY

An object of the present disclosure is to provide a cylinder deactivation arrangement for an internal combustion engine for usage at different RPM levels, which may be produced at a reasonable cost and as a robust solution compared to prior art solutions.

Thus, the disclosure relates to a cylinder deactivation arrangement for an internal combustion engine comprising a number of cylinders with at least one intake valve and at least one exhaust valve per cylinder, wherein each intake valve comprises merely two different lifting levels. The cylinder deactivation arrangement comprises an even number of cylinders, a first set of cylinders constituted by half of the even number of cylinders have intake valves configured for fully opened and partly opened lifting levels, a second set of cylinders constituted by the other half of the even number of cylinders have intake valves configured for fully opened and closed lifting levels. The first set of cylinders have exhaust valves configured for fully opened lifting levels and said second set of cylinders have exhaust valves configured for fully opened and closed lifting levels.

The lifting level is the largest distance a specific valve opens during a combustion cycle. For example, fully opened lifting level corresponds to the maximum distance a valve can be opened. It is understood that although a valve, such as some exhaust valves of the previously described embodiment can be both closed and fully opened during different time intervals of the combustion cycle, such valves are configured for only one lifting level. The lifting level thereby corresponds to the different amount of lifting that can be performed for a specific valve with a certain configuration. The person reasonably skilled in the art understands that each of the valves can be fully closed at least at some point during the combustion cycle although they are only configured for one lifting level. Independent of the number of lifting levels valves can always be closed at other parts of the combustion cycle, i.e., the closed state is not counted as a lifting level.

The usage of merely two lifting levels is a solution in order to maintain reasonable production prices and keep the space required for the arrangement to an implementable size. Furthermore, such arrangements are associated with better robustness for tolerance in the system which has the effect that fewer seal failures and lubrication problems occur in comparison to solutions with three or more lifting levels.

In one embodiment of the cylinder deactivation arrangement, said cylinder deactivation arrangement has at least four cylinder deactivation states, in a first cylinder deactivation state, said first set of cylinders have intake valves configured for partly opened lifting levels and exhaust valves configured for fully opened lifting levels, for said second set of cylinders all valves are deactivated,
  in a second cylinder deactivation state, said first set of cylinders have intake valves configured for fully opened lifting levels and exhaust valves configured for fully opened lifting levels, for said second set of cylinders all valves are deactivated,
  in a third cylinder deactivation state said first set of cylinders have intake valves configured for partly opened lifting levels and exhaust valves configured for fully opened lifting levels, for said second set of cylinders all intake and exhaust valves are configured for fully opened lifting levels, and
  in a fourth cylinder deactivation state all intake and exhaust valves for both sets are configured for fully opened lifting levels.

The disclosure provides the possibility to utilize multiple states, for example, four states as described in one embodiment of the disclosure. Those four states provide complementary states in relation to the prior art solutions. By adding states wherein intake valves can be partly opened the RPM and load level range in which the cylinder deactivation is beneficial significantly increases. It should be noted that the numbering of the states presented herein are not a strict designated order for how the states might engage and they can be engaged in any suitable order.

In another embodiment of the cylinder deactivation arrangement, an engine control unit determines a cylinder deactivation state based on the revolutions-per-minute (RPM) of the internal combustion engine.

The orders in which the different states are engaged may be decided e.g., by an engine control unit. The engine control unit can be e.g., a standard engine control unit that also serves the purpose of controlling other features of the internal combustion engine. In another embodiment the engine control unit might be a separate control unit for controlling cylinder deactivation. In either case, the engine control unit may comprise a processor and memory storing suitable computer executable instructions for performing the various functions and/or operations described herein. By controlling the cylinder deactivation state extended efficiency can be achieved by applying the right state at the right load level. This decreases the fuel consumption and emission levels for the internal combustion engine.

In yet another embodiment of the cylinder deactivation arrangement each valve is arranged to in total engage with no more than two different cam profiles.

In one embodiment of the disclosure the valves are opened with cam profiles constituted by notches on camshafts.

In one embodiment of the cylinder deactivation arrangement each cylinder comprises multiple intake valves. In this case, the partly opened lifting level may be achieved by opening some, but not all, of the intake valves for each cylinder.

The numbers of intake valves are not limited to one intake valve for each cylinder and can, depending on the design of the internal combustion engine, be for example two or four intake valves. The person skilled in the art recognizes that such arrangement also, but not necessary, could comprise multiple exhaust valves. Engines with more than one intake or exhaust valve per cylinder are commonly referred to as multi-valve engines and are beneficial because they for example can operate at higher RPMs.

An embodiment of the disclosure comprises a method performed by a cylinder deactivation arrangement for an internal combustion engine comprising a number of cylinders with at least one intake valve and at least one exhaust valve per cylinder, wherein each intake valve comprises merely two different lifting levels, wherein the cylinder deactivation arrangement comprises an even number of cylinders and that, a first set of cylinders constituted by half of the even number of cylinders have intake valves configured for fully opened and partly opened lifting levels, a second set of cylinders constituted by the other half of the even number of cylinders have intake valves configured for fully opened and closed lifting levels and said cylinder deactivation arrangement has at least four cylinder deactivation states wherein the method comprises:

in a first cylinder deactivation state:
    deactivating all intake and exhaust valves of said second set of cylinders,
    lifting the intake valves of said first set of cylinders to a partly opened lifting level, and
    lifting the exhaust valves of said first set of cylinders to a fully opened lifting level, in a second cylinder deactivation state:
    deactivating all intake and exhaust valves of said second set of cylinders,
    lifting the intake valves of said first set of cylinders to a fully opened lifting level, and
    lifting the exhaust valves of said first set of cylinders to a fully opened lifting level, in a third cylinder deactivation state:
    lifting the intake valves of said first set of cylinders to a partly opened lifting level,
    lifting the intake valves of said second set of cylinders to a fully opened lifting level,
    lifting the exhaust valves of said first set of cylinders to a fully opened lifting level, and
    lifting the exhaust valves of said second set of cylinders to a fully opened lifting level,
  in a fourth cylinder deactivation state:
    lifting the intake valves of said first set of cylinders to a fully opened lifting level,
    lifting the exhaust valves of said first set of cylinders to a fully opened lifting level, lifting the intake valves of said second set of cylinders to a fully opened lifting level, and lifting the exhaust valves of said second set of cylinders to a fully opened lifting level.

The aforementioned embodiment can be combined in any way possible as long as it is not clearly contradictory.

According to one embodiment a method for cylinder deactivation comprises:

determining the current RPM of said internal combustion engine, determining, based on the RPM, which of the four states to use, performing cylinder deactivation based on the determined state.

A further embodiment of the disclosures comprises a method for cylinder deactivation in an internal combustion engine comprising a number of cylinders, each cylinder comprising at least an intake valve and at least an exhaust valve, each intake valve comprises merely two different lifting levels, wherein the cylinders subjected to cylinder deactivation are an even number of cylinders, and that half of the cylinders have intake valves configured with the lifting levels open and partly opened, while the other half are configured with the lifting levels opened and closed, and wherein half of the cylinders have exhaust valves that are configured with the lifting levels opened and closed, while the other half are configured with an opened lifting level, said valves are arranged to allow for at least four different states wherein the method comprises:

determining the current RPM of said internal combustion engine, determining, based on the RPM, which of the at least four states to use, performing cylinder deactivation based on the determined state.

Another embodiment of the disclosure comprises the method for cylinder deactivation wherein, each valve is adapted to in total engage with no more than two different cam profiles.

In one embodiment of the disclosure, an internal combustion engine comprises a cylinder deactivation arrangement for cylinder deactivation.

In one embodiment of the disclosure a vehicle comprises a cylinder deactivation arrangement for cylinder deactivation.

The cylinder deactivation or methods for cylinder deactivation are beneficially arranged for usage with a vehicle such as a passenger car, bus, lorry, or any other form of transportation.

BRIEF DESCRIPTION OF THE DRAWINGS

The disclosure is now described, by way of example, with reference to the attached drawings.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In the following, a detailed description of the different embodiments of the disclosure is disclosed under reference to the accompanying drawings. All examples herein should be seen as part of the general description and are therefore possible to combine in any way of general terms. Individual features of the various embodiments and embodiments may be combined or exchanged unless such combination or exchange is clearly contradictory to the overall function of the cylinder deactivation arrangement.

Briefly described the disclosure relates to a cylinder deactivation arrangement for an internal combustion engine. The cylinder deactivation arrangement utilizes valve arrangements with a maximum of two modes of lifting levels for each valve. Utilization of those two lifting levels for each valve in different combinations allows for a system that enables four different states. Thereby a cylinder deactivation arrangement which in comparison to prior art provides an extended range relating to the internal combustion engines RPM and load levels can be achieved. The cylinder deactivation arrangement and methods further comprises different embodiments as described below.

Figure 1:
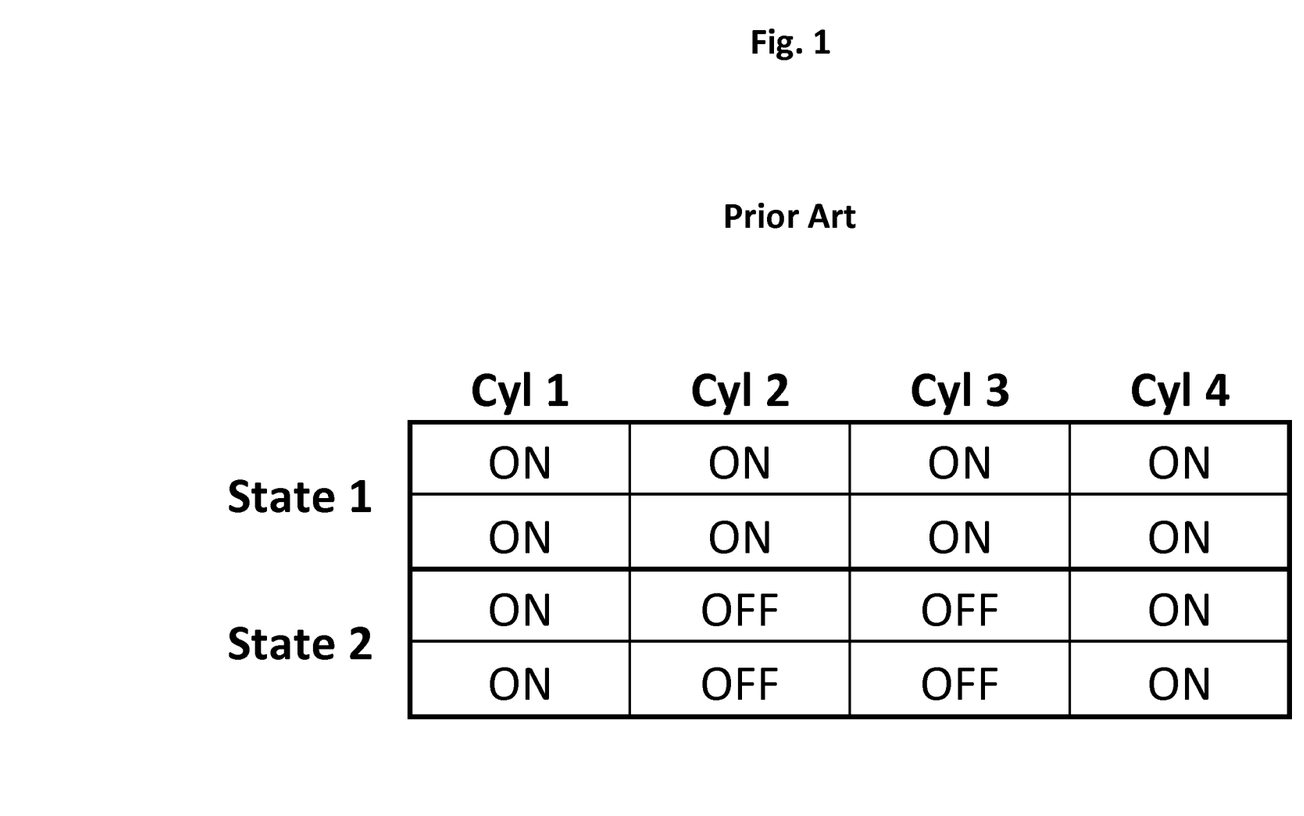
FIG. 1 illustrates the two states of cylinder deactivation in accordance with the prior art.

In FIG. 1 the functionality of a state of the art cylinder deactivation system is illustrated through a table. The table describes the different modes of intake valves and exhaust valves at two different states. This is a common solution for cylinder deactivation in accordance with what previously was described in the background art. In both State 1 and State 2 the intake valve and exhaust valve for each cylinder have the same lifting levels, for example in State 1 which represent situations when an internal combustion engine runs at high load all cylinders, and thereby all valves, are activated to be fully lifted. The person reasonably skilled in the art understands that activated indicates that the valves can be opened and closed at determined intervals corresponding to the combustion cycle of the internal combustion engine. For example, the process might be:

The intake valve opens.

Air is drawn in to the cylinder while the piston moves downwards within the cylinder.

The intake valve closes, fuel is injected, and the compression is started with the piston moving upwards towards the valves.

At the right point in time an explosion occurs due to high compression, due to a spark introduced by a sparkplug, or any other form of ignition form suitable for an internal combustion engine.

The piston is forced downwards by the explosion until it reaches the bottom of the cylinder.

The exhaust valve is opened and the exhaust gases emissions out of the cylinder.

The exhaust valve close, completing the cycle and the cycle starts over again.

In State 1, the aforementioned cycle, or a similar engine cycle, is performed with all cylinders of the internal combustion engine activated. In State 2, half of the engine cylinders are deactivated meaning that the valves of those cylinders do not open during the cycle. However, the piston is still moving within the cylinder although the cylinder is deactivated.

There are multiple ways to perform lifting of a valve and one common solution is to use camshafts with notches at different levels determining the lifting level for each valve. Such notches are typically formed as non-pointy drops of water with the axle passing through substantially at one end. Thereby, the notch can lift a valve at one position of the revolving movement of the camshaft. Multiple notches are thereby required in order to provide multiple lifting levels. Another solution is for example hydraulic lifting arms.

Figure 2:
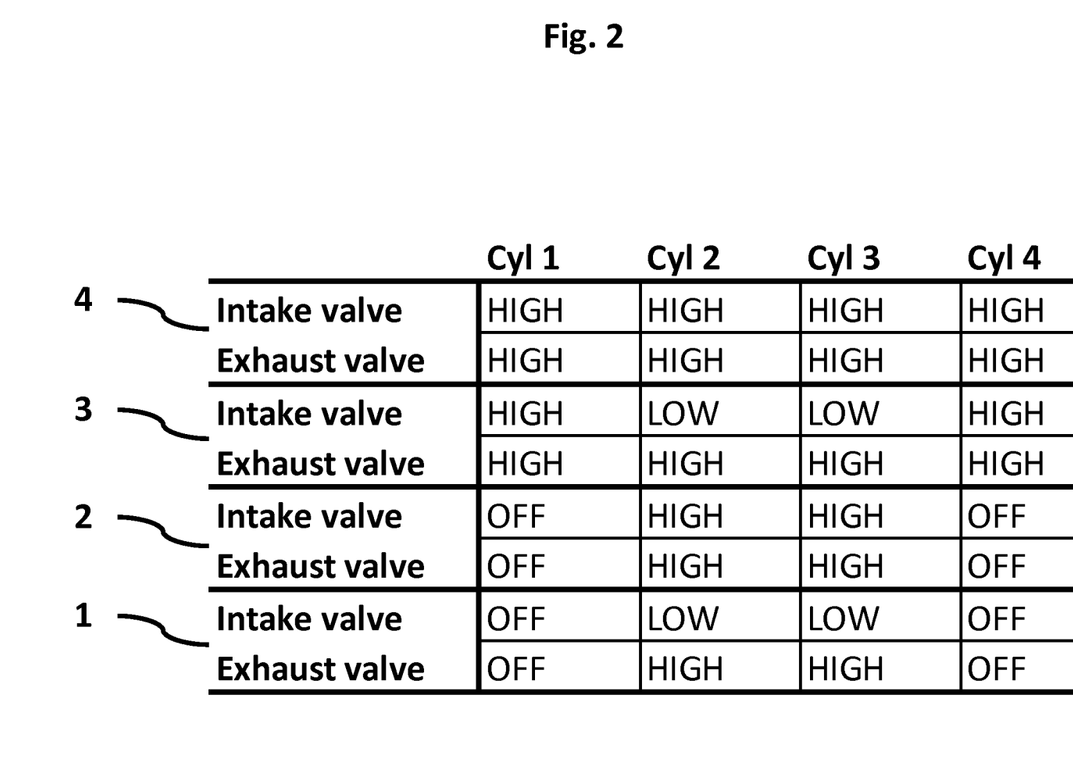
FIG. 2 illustrates cylinder deactivation according to an exemplifying embodiment of the present disclosure.

FIG. 2 illustrates a similar engine configuration as FIG. 1 comprising four cylinders but with the difference that some of the valves are configured with dual lifting levels in accordance with the present disclosure. The dual lifting levels as such enable the extended amount of states providing the benefits of the disclosure by enabling a solution wherein the previous two states, as illustrated by the prior art in FIG. 1, can be extended to four states 1, 2, 3, 4 allowing for an increased range of RPMs for which the cylinder deactivation can be used. The fourth state 4 and the second state 2 corresponds to State 1 and 2 of the prior art as previously described while the first state 1 and the third state 3 are part of the novel solution of the present disclosure.

The first state 1 illustrates a state adapted for when the engine is running at a low engine load. Half of the cylinders are deactivated while the other half runs at a load needing less air than usual, meaning that less fuel needs to be injected into the cylinder in order to achieve the desired fuel to air mixture. This is achieved by utilizing one of the two lifting levels for half of the involved cylinders wherein the intake valve only opens partially of its full capacity. This creates a state that allows less air to be drawn in to the cylinder. The exhaust valve still opens to its full capacity in order to keep the pumping losses to a minimum.

The third state 3 is a step implemented between State 1 and 2 of the prior art and thereby covering engine loads where the engine needs more power than State 2 provides but at loads wherein there still is no need for the full capacity of the engine. In the example embodiment presented in FIG. 2 the first and fourth cylinders are running at full capacity and all their valves opens to the full lifting level. The intake valves of the second and third cylinders open only partially in order to allow less air to be drawn in to those cylinders and thereby reducing the total volume of air used for the combustion cycle. That has the effect that for those cylinders less fuel needs to be injected. It should be noted that such adaption of the fuel injection might be conducted by for example an engine control unit, a mass air flow sensor, or any other means suitable to adjust the fuel injection or fuel delivery to the cylinders.

The example as illustrated in the figures represents a model of a four cylinder internal combustion engine. However, the person reasonably skilled in the art understands that the same reasoning can be applied to any engine running on any number of cylinders, including but not limited to a straight 3-cyl, 4-cyl, 5-cyl, 6-cyl, 8-cyl, 12-cyl, 16-cyl, flat 4-cyl, 6-cyl, 8-cyl, radial 4-cyl, 5-cyl, 6-cyl, 7-cyl, 8-cyl, or V4, V6, V8, V12 engines. It is also understood that the disclosure is not limited to implementation at a specific cylinder number, for example 1 and 4, and thereby can be implemented in any suitable fashion depending on the engine configuration and design of the internal combustion engine.

The internal combustion engine wherein the cylinder deactivation arrangement is arranged can comprise any number of cylinders, for example 2, 4, 5, 6, or 8, and is not limited to any specific type of engine. The cylinder deactivation arrangement utilizes an even number out of those cylinders in order to perform cylinder deactivation. This means that some, the majority, or all of the cylinders in an internal combustion engine might be used for the cylinder deactivation in accordance with the present disclosure depending on the design of the internal combustion engine. It is beneficial, however not mandatory within the scope of the disclosure, that the majority of cylinders are used for cylinder deactivation. In one embodiment of the disclosure only four out of for example eight cylinders might be used for cylinder deactivation.

Figure 3:
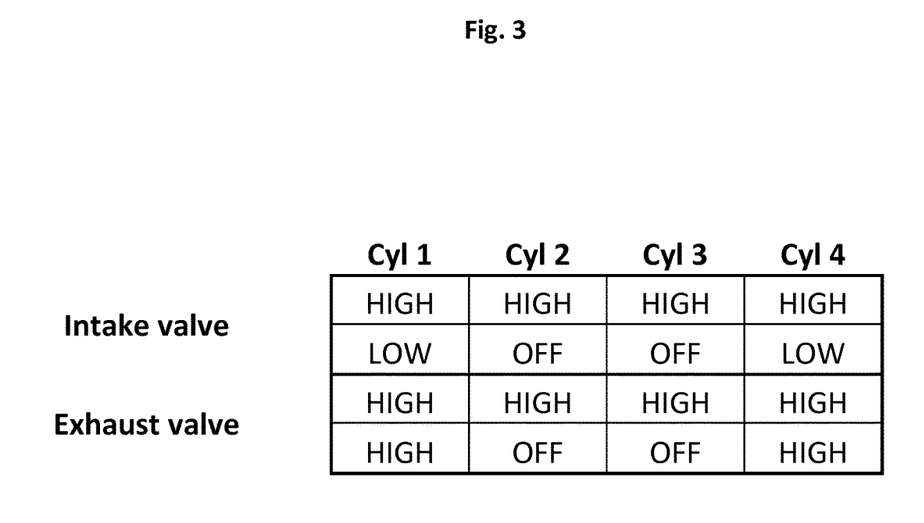
FIG. 3 illustrates a novel valve mode configuration for each valve in accordance with an exemplifying embodiment of the present disclosure.

In FIG. 3 the different modes of lifting levels for each valve are illustrated. The present disclosure provides different lifting levels for different valves in order to create a solution wherein multiple states can be achieved while maintaining the simplicity of valves with only two lifting levels. It should be noted that valve configuration in relation to the cylinder order, number of cylinders, and number of valves for each cylinder does not intend to limit the scope of the disclosure and only illustrates the underlying concept of the disclosure.

The first and fourth cylinder may in one embodiment for example have an intake valve adapted to comprise two lifting levels, for example high and low. This means that the intake valve in this particular case for example can be subjected to two different cam profiles allowing for the high and low lifting levels. The exhaust valve in such an embodiment may be configured to only comprise a high lifting level. It should be noted that for most applications it is beneficial to not limit the outlet from any cylinder, such limitation may only increase pumping losses.

The second and third cylinder may in one embodiment be configured in a traditional way, wherein a full lifting level together with a disabled lifting level are the two configured lifting levels.

The disclosure combines the different valve lifting level configurations and it is therefore the arrangement comprises at least two cylinder sets of different configuration. Cylinder sets can for example in one embodiment related to the example as provided in FIG. 2 be a first set of cylinders comprising cylinder one and four, and a second set of cylinders comprising cylinder two and three. However, the sets of cylinder might be any cylinders suitable to be combined to similar cylinder deactivation configurations. Another example not shown in the figures are a five cylinder engine wherein each set comprises two cylinders and wherein one cylinder thereby is excluded from the cylinder deactivation process and constantly operates according to normal cylinder procedures of the combustion cycle.

Figure 8:
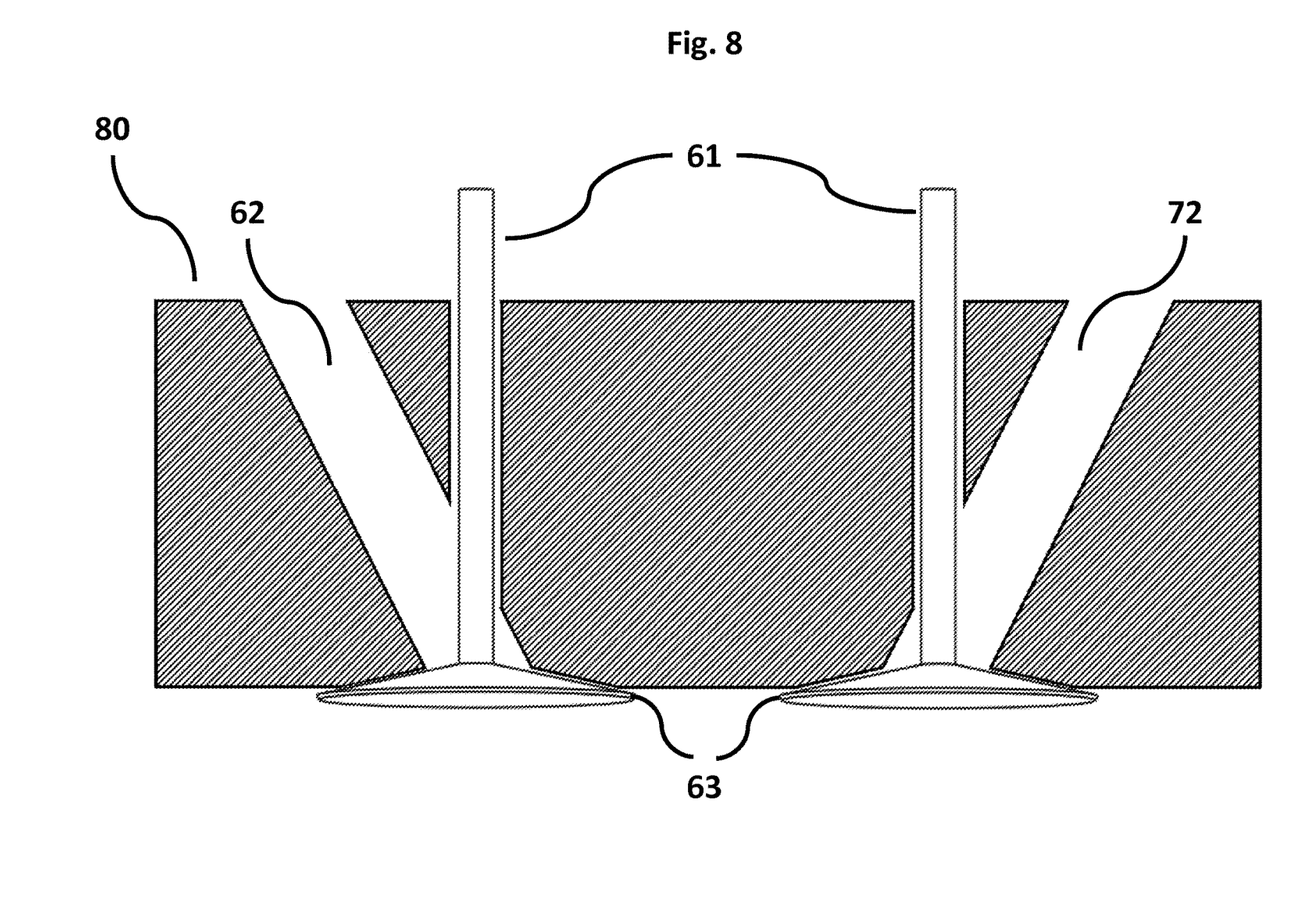
FIG. 8 illustrates a valve arrangement at a deactivated state.

The person skilled in the art further understands that in addition to the lifting levels each valve can at some point the combustion cycle be stationary in a closed position substantially sealing the outlet 72 or inlet 62 from the internal volume of the cylinder as shown in for example FIG. 8.

Figure 4:
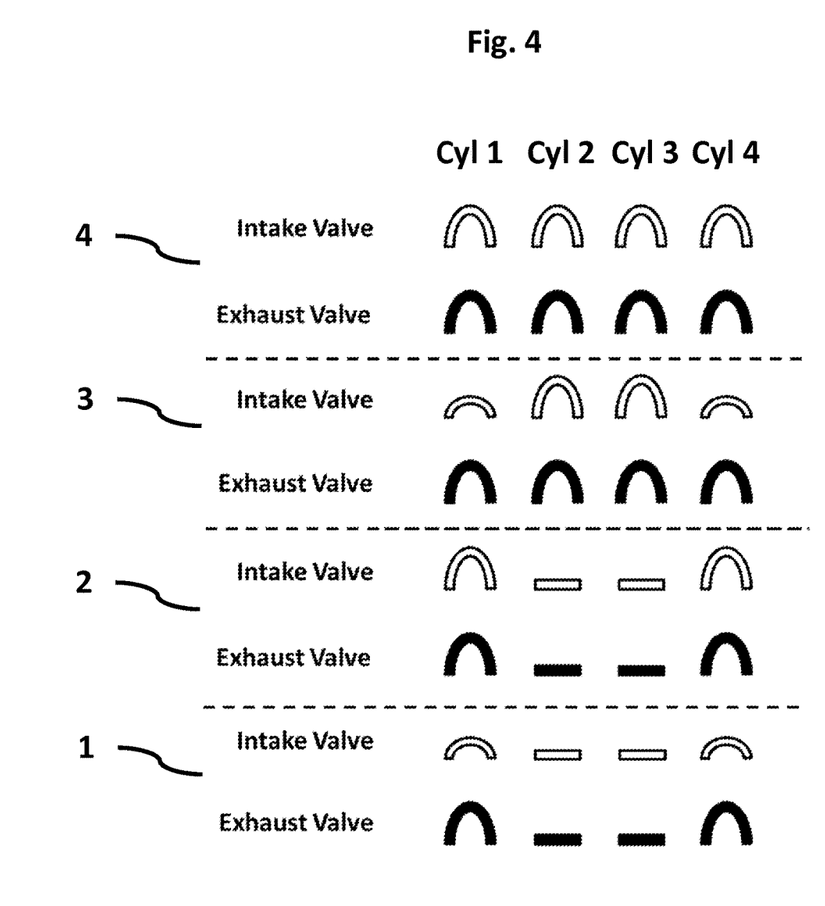
FIG. 4 illustrates the different states of cylinder deactivation in accordance with an exemplifying embodiment of the present disclosure.

FIG. 4 clarifies the disclosure as disclosed in FIGS. 2 and 3 in terms of clarifying that it is not relevant for the scope of the disclosure which cylinders to apply which lifting levels to. For this embodiment, cylinders two and three are deactivated at low engine loads which can be compared to for example the embodiment of FIG. 2 wherein cylinders one and four were deactivated at low engine loads. The person reasonably skilled in the art understands that any combinations of cylinders for each set are possible depending on the design of the internal combustion engine.

The illustrations of high and low lifting levels of FIG. 4 further illustrate an example of how cam profiles in one embodiment of the disclosure might look. I.e., the notches of each cam profile might in concept correspond to the arches as illustrated in FIG. 4.

Figure 5:
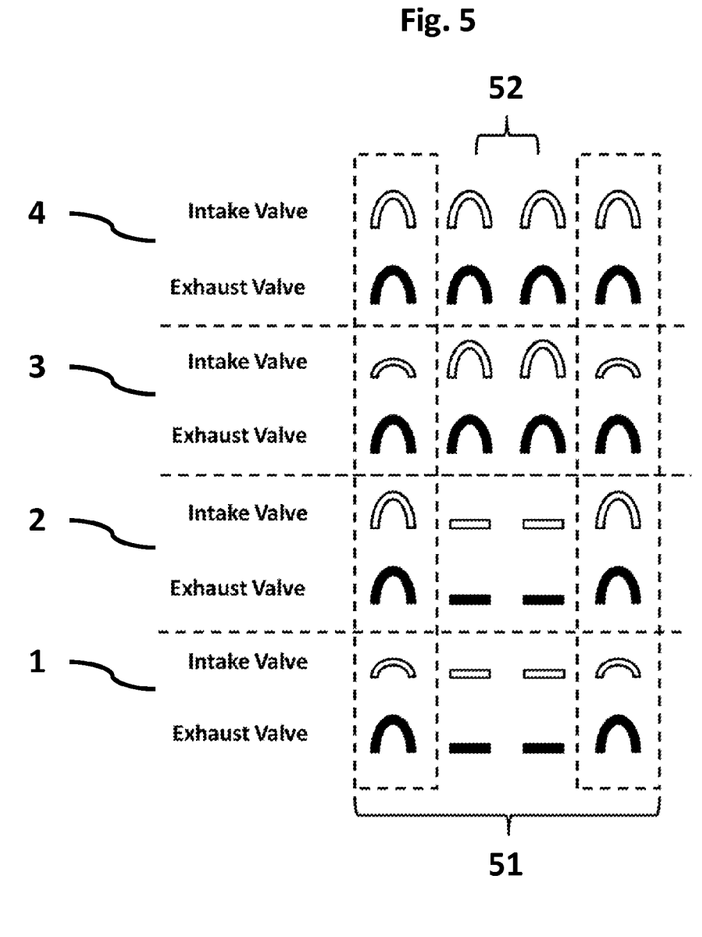
FIG. 5 illustrates the different states of cylinder deactivation and how they relate to the sets of cylinders according to an exemplifying embodiment of the present disclosure.

FIG. 4 can further be clarified by describing the combustion cycle for the different stages 1, 2, 3, 4. The cycle is based on a normal Otto cycle in accordance with the four stroke principal. However, cylinder deactivation is implemented with different lifting levels for different cylinder sets. The cylinders are in the four cylinder example presented in FIG. 4 paired in to two different sets, which is further described in FIG. 5.

The different lifting levels available in the example of FIG. 4 are fully opened, partly opened, and closed. Each valve only has a maximum of two lifting levels, i.e., each valve can only comprise two out of the lifting levels fully opened, partly opened, and closed. The person skilled in the art understands that a closed lifting level is a lifting level that keeps the valve closed through the entire combustion cycle and is thereby different from valves with other lifting levels which are both opened and closed during each cycle. For example, the intake valve of the first and fourth cylinders comprises fully opened and partly opened lifting levels meaning that the first and third cylinders can't be deactivated. Those cylinders instead can run at partly or full lifting levels. The second and third cylinders comprise fully opened and fully closed lifting levels. Those cylinders can thereby be either in full operation or deactivated.

Depending on the configuration and design of the internal combustion engine the cylinder deactivation may be applied to different cylinders. However, in one embodiment of the disclosure the cylinder deactivation configuration is divided into two different sets of cylinders 51, 52. Dividing the number of cylinders in to two even sets 51, 52 is beneficial in order to combine the valves with two lifting levels in a way that multiple states can be accomplished in accordance with the present disclosure. In the example embodiment illustrated in FIG. 5 the first cylinder and the fourth cylinders together constitutes a first set 51 and the second and third cylinders together constitutes a second set 52. It should be noted that any configuration and thereby set constitution is viable within the scope of the disclosure, not limited to a 4-cyl engine.

Figure 6:
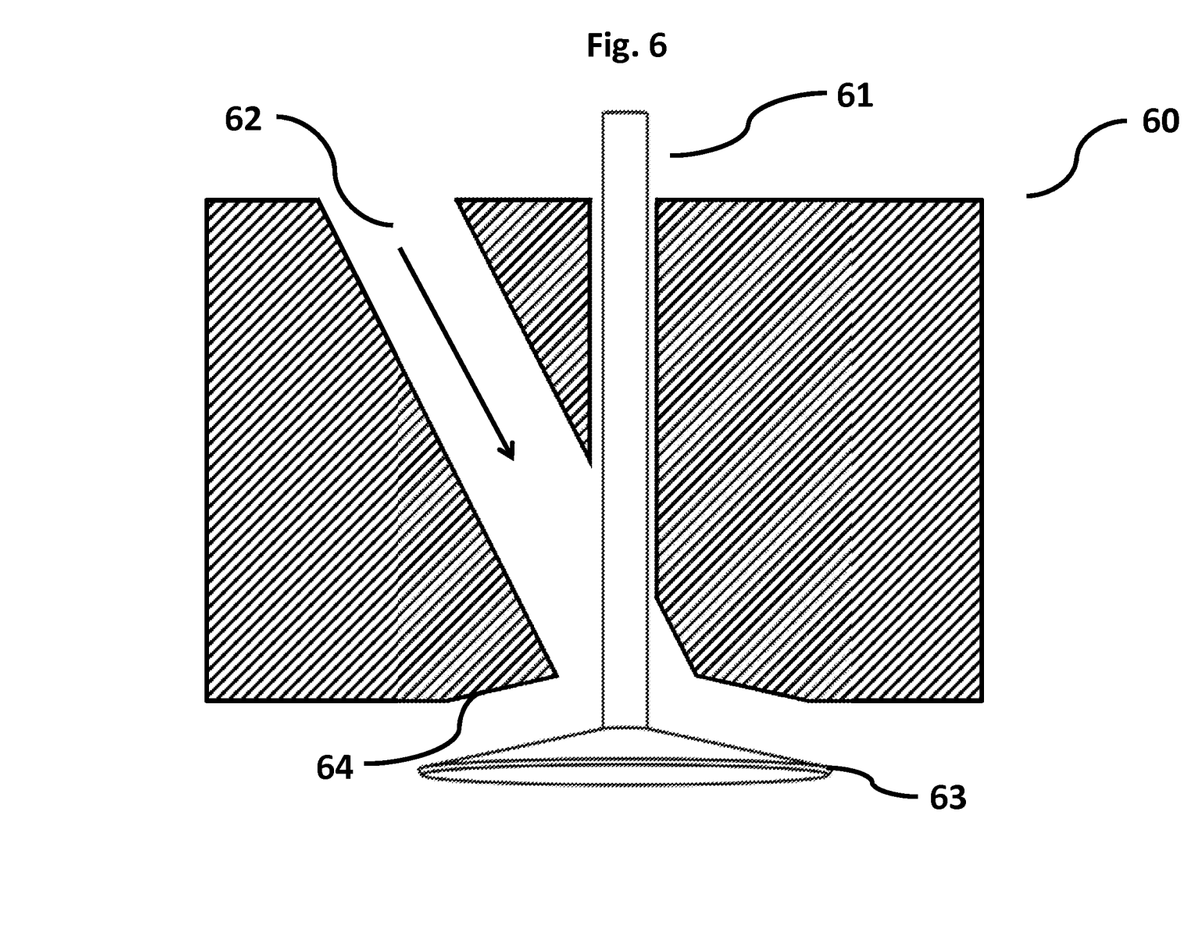
FIG. 6 illustrates a valve arrangement wherein the valve is at a partly opened lifting level.

In FIG. 6 a partial valve arrangement 60 is illustrated showing the different parts of how a valve arrangement may be constructed in an exemplifying embodiment. The valve arrangement 60 comprises a valve 61, for example an intake valve, with a valve disk 63 adapted to seal towards a surface 64 of a cylinder head. The valve disk 63 seals the intake channel 62 adapted to allow air to be drawn in to the cylinder. FIG. 6 illustrates the valve 61 in a partly opened lifting mode wherein the valve lifter (not shown) has lifted the valve 61 partly from the sealing position.

There are multiple valve lifter arrangements that may act on the valve in order to move it from a closed position to a desired lifting level. Examples of valve lifters are camshafts or hydraulic valve lifters. There are also variable options such as sliding cam, collapsible HLA, and switchable roll finger follower. However, the method of lifting the valves can be performed in many different ways within the scope of the disclosure.

Figure 7:
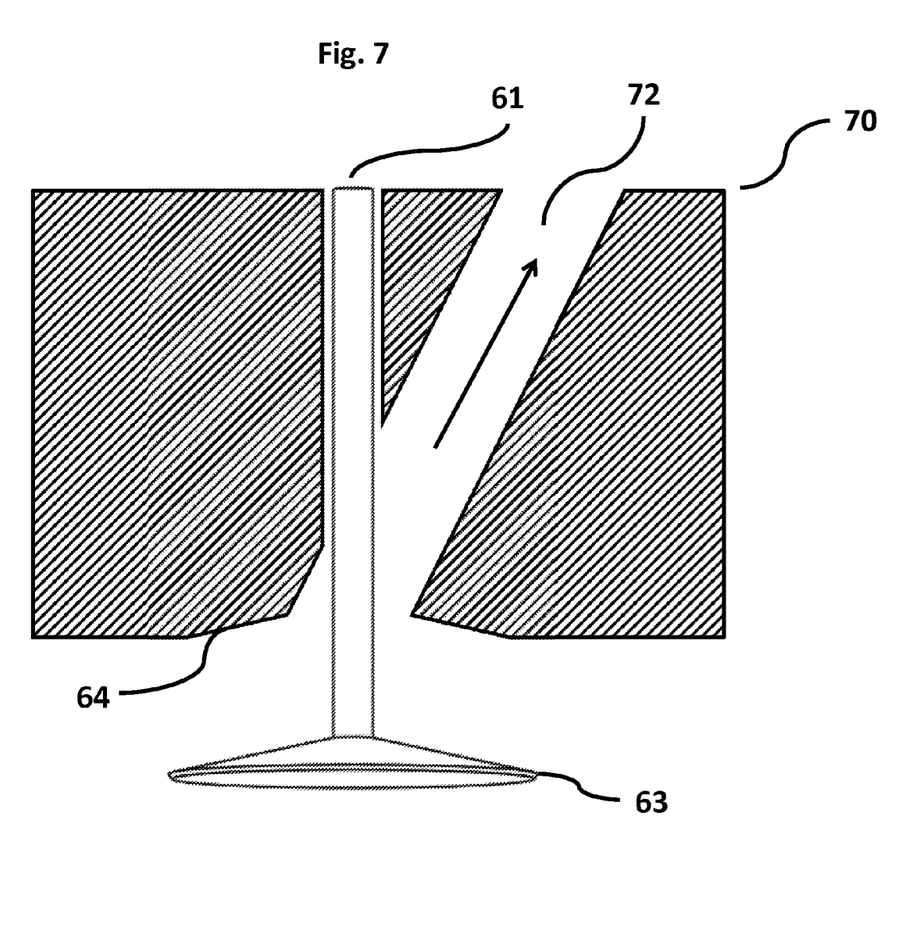
FIG. 7 illustrates a valve arrangement wherein a valve is at a fully opened lifting level.

FIG. 7 shows the valve 61 in a fully opened position, which for example is the standard lifting level for exhaust valves in activated cylinders. The partial valve arrangement 70 in FIG. 7 illustrates a valve 61, for example an exhaust valve, with a valve disk 63 adapted to seal the outlet channel 72 by abutting the surface 64 of the cylinder head.

FIG. 8 shows a complete valve arrangement 80 illustrating both an intake valve 61 and an outlet valve 61 with the intake channel 62 and the outlet channel 72. The complete valve arrangement 80 of FIG. 8 illustrates a deactivated cylinder where all valves 61 are in closed positions. The person reasonably skilled in the art understands that FIG. 8 also can illustrate the combustion step of the combustion cycle.

The complete valve arrangement 80 may in different embodiments comprise different numbers of valves. For example, one embodiment might comprise two or more of each valve type, i.e., for example two intake and exhaust valves per cylinder.

It should be noted that in the detailed description above any embodiment or feature of an embodiment are only examples and could be combined in any way if such combination is not clearly contradictory.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A cylinder deactivation arrangement for an internal combustion engine, the cylinder deactivation arrangement comprising:
    an even number of cylinders with at least one intake valve and at least one exhaust valve per cylinder, each intake valve having two different lifting levels;
    wherein a first set of cylinders comprised of half of the even number of cylinders have intake valves configured for fully opened and partly opened lifting levels, and a second set of cylinders comprised of a remaining half of the even number of cylinders have intake valves configured for fully opened and closed lifting levels;
    wherein the first set of cylinders have exhaust valves configured for fully opened lifting levels, and the second set of cylinders have exhaust valves configured for fully opened and closed lifting levels.

2. The cylinder deactivation arrangement according to claim 1 wherein the cylinder deactivation arrangement has at least four cylinder deactivation states,
    in a first cylinder deactivation state, the first set of cylinders have intake valves configured for partly opened lifting levels and exhaust valves configured for fully opened lifting levels, for the second set of cylinders all valves are deactivated,
    in a second cylinder deactivation state, the first set of cylinders have intake valves configured for fully opened lifting levels and exhaust valves configured for fully opened lifting levels, for the second set of cylinders all valves are deactivated,
    in a third cylinder deactivation state the first set of cylinders have intake valves configured for partly opened lifting levels and exhaust valves configured for fully opened lifting levels, for the second set of cylinders all valves are configured for fully opened lifting levels, and in a fourth cylinder deactivation state all valves are configured for fully opened lifting levels.

3. The cylinder deactivation arrangement according to claim 2 wherein an engine control unit determines a cylinder deactivation state based on a revolutions-per-minute (RPM) of the internal combustion engine and engine load.

4. The cylinder deactivation arrangement according to claim 1 wherein each valve is arranged to in total engage with no more than two different cam profiles.

5. The cylinder deactivation arrangement according to claim 1 wherein each cylinder comprises multiple intake valves and the partly opened lifting level is achieved by opening some, but not all, of the intake valves for each cylinder.

6. An internal combustion engine comprising a cylinder deactivation arrangement for cylinder deactivation according to claim 1.

7. A vehicle comprising a cylinder deactivation arrangement for cylinder deactivation according to claim 1.

8. A method performed by a cylinder deactivation arrangement for an internal combustion engine, the cylinder deactivation arrangement comprising an even number of cylinders with at least one intake valve and at least one exhaust valve per cylinder, each intake valve having two different lifting levels, wherein a first set of cylinders comprised of half of the even number of cylinders have intake valves configured for fully opened and partly opened lifting levels and a second set of cylinders comprised of a remaining half of the even number of cylinders have intake valves configured for fully opened and closed lifting levels, the cylinder deactivation arrangement having at least four cylinder deactivation states, the method comprising:

in a first cylinder deactivation state,
   deactivating all valves of the second set of cylinders;
   lifting the intake valves of the first set of cylinders to a partly opened lifting level; and
   lifting the exhaust valves of the first set of cylinders to a fully opened lifting level;

in a second cylinder deactivation state,
   deactivating all valves of the second set of cylinders;
   lifting the intake valves of the first set of cylinders to a fully opened lifting level; and
   lifting the exhaust valves of the first set of cylinders to a fully opened lifting level;

in a third cylinder deactivation state,
   lifting the intake valves of the first set of cylinders to a partly opened lifting level;
   lifting the intake valves of the second set of cylinders to a fully opened lifting level;
   lifting the exhaust valves of the first set of cylinders to a fully opened lifting level; and
   lifting the exhaust valves of the second set of cylinders to a fully opened lifting level; and in a fourth cylinder deactivation state,
   lifting the intake valves of the first set of cylinders to a fully opened lifting level;
   lifting the exhaust valves of the first set of cylinders to a fully opened lifting level;
   lifting the intake valves of the second set of cylinders to a fully opened lifting level; and
   lifting the exhaust valves of the second set of cylinders to a fully opened lifting level.

9. The method for cylinder deactivation according to claim 8 further comprising:
   determining a current revolution-per-minute (RPM) and an engine load of the internal combustion engine;
   determining, based on the RPM and the engine load, which of the at least four cylinder deactivation states to use; and
   performing cylinder deactivation based on a determined state to use.

10. The method for cylinder deactivation according to claim 9 wherein each valve in total engages with no more than two different cam profiles.

* * * * *